(12) United States Patent
Hendriks et al.

(10) Patent No.: US 7,433,255 B2
(45) Date of Patent: Oct. 7, 2008

(54) INFORMATION CARRIER, AND SYSTEM FOR POSITIONING SUCH AN INFORMATION CARRIER IN AN APPARATUS

(75) Inventors: Robert Frans Maria Hendriks, Eindhoven (NL); Thomas Jan De Hoog, Eindhoven (NL); Peter Van Der Walle, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 158 days.

(21) Appl. No.: 11/568,241

(22) PCT Filed: Apr. 21, 2005

(86) PCT No.: PCT/IB2005/051303

§ 371 (c)(1),
(2), (4) Date: Oct. 24, 2006

(87) PCT Pub. No.: WO2005/106856

PCT Pub. Date: Nov. 10, 2005

(65) Prior Publication Data

US 2007/0277192 A1    Nov. 29, 2007

(30) Foreign Application Priority Data

Apr. 28, 2004    (EP) .................................. 04300239

(51) Int. Cl.
*G11C 7/00*    (2006.01)

(52) U.S. Cl. ............................ 365/215; 365/63; 365/64; 356/401; 356/605; 356/618; 358/533; 235/454; 235/470

(58) Field of Classification Search ............... 365/64, 365/215, 63; 720/745; 356/401, 605, 618; 250/548, 237 G; 235/454, 470; 358/533
See application file for complete search history.

(56) References Cited

U.S. PATENT DOCUMENTS 4,664,524 A    5/1987   Hattori et al.

(Continued)

FOREIGN PATENT DOCUMENTS

EP    0965889 A2    12/1999

(Continued)

OTHER PUBLICATIONS

Written Opinion of the International Searching Authority PCT/IB2005/051303.

*Primary Examiner*—Richard T. Elms
*Assistant Examiner*—Eric Wendler
(74) *Attorney, Agent, or Firm*—Michael E. Belk

(57) ABSTRACT

The invention relates to an information carrier, and a system for positioning such an information carrier in an apparatus. This system comprises an optical element (102) for generating a periodic array of light spots (103) intended to be applied to an information carrier (101), said information carrier (101) comprising a first periodic structure (108) intended to interfere with said periodic array of light spots (103) for generating a first Moiré pattern, and a second periodic structure (109) intended to interfere with said periodic array of light spots (103) for generating a second Moiré pattern, analysis means for deriving from said first and second Moiré patterns, the angle value (S) between said periodic array of light spots (103) and said information carrier (101), and actuation means (AC1-AC2-AC3) for adjusting the angular position of said information carrier (101) with respect to said array of light spots (103), from control signals (114) derived based on said angle value (S).

9 Claims, 13 Drawing Sheets

U.S. PATENT DOCUMENTS

| | | | |
|---|---|---|---|
| 4,774,400 A | | 9/1988 | Kimura |
| 4,908,656 A | * | 3/1990 | Suwa et al. .................... 355/53 |
| 5,075,562 A | * | 12/1991 | Greivenkamp et al. . 250/559.05 |
| 5,307,152 A | * | 4/1994 | Boehnlein et al. ........... 356/605 |

FOREIGN PATENT DOCUMENTS

JP  60263343  6/1984

\* cited by examiner

107

105
103

A

B

C

D

INFORMATION CARRIER, AND SYSTEM FOR POSITIONING SUCH AN INFORMATION CARRIER IN AN APPARATUS

FIELD OF THE INVENTION

The invention relates to a system for positioning an information carrier in a reading apparatus.

The invention also relates to said information carrier.

The invention has applications in the field of optical data storage.

BACKGROUND OF THE INVENTION

The use of optical storage solutions is nowadays widespread for content distribution, for example in storage systems based on the DVD (Digital Versatile Disc) standards. Optical storage has a big advantage over hard-disk and solid-state storage in that the information carriers are easy and cheap to replicate.

However, due to the large amount of moving elements in the drives, known applications using optical storage solutions are not robust to shocks when performing read/write operations, considering the required stability of said moving elements during such operations. As a consequence, optical storage solutions cannot easily and efficiently be used in applications which are subject to shocks, such as in portable devices.

New optical storage solutions has thus been developed. These solutions combine the advantages of optical storage in that a cheap and removable information carrier is used, and the advantages of solid-state storage in that the information carrier is still and that its reading requires a limited number of moving elements.

OBJECT AND SUMMARY OF THE INVENTION

It is an object of the invention to propose a system for accurately positioning an information carrier with respect to an array of light spots in a reading and/or writing apparatus.

The system according to the invention comprises:
- an optical element for generating a periodic array of light spots intended to be applied to an information carrier, said information carrier comprising a first periodic structure and a second periodic structure, said first and second periodic structures being intended to interfere with said periodic array of light spots for generating a first Moiré pattern and a second Moiré pattern, respectively,
- analysis means for deriving from said first and second Moiré patterns the angle value between said periodic array of light spots and said information carrier,
- actuation means for adjusting the angular position of said information carrier with respect to said array of light spots based on control signals derived from said angle value.

The array of light spots is applied to the information carrier for reading the data stored on said information carrier. Since the information carrier corresponds to a matrix of transparent or non-transparent elementary areas; the array of light spots is regular and defines a periodic grid. According to the state of transparency of the elementary areas, the light spots are transmitted or not to a detector intended to convert the received light signals into binary data.

The information carrier comprises periodic structures placed beside the data area intended to store data. When the array of light spots interferes with these periodic structures, Moiré patterns are generated and detected. In analysing the Moiré Patterns, it becomes possible to accurately measure the angular misalignment between the information carrier and the array of light spots because a small misalignment between the array of light spots and the information carrier results in a large change of the Moiré Patterns. Control signals reflecting the misalignment can thus be derived from the Moiré Patterns, and used as input signals for actuators intended to vary the relative angular position between the information carrier and the array of light spots. The light spots and the elementary areas of the information carrier may thus perfectly be aligned, resulting in a reading of the information carrier with a low error rate.

The invention also relates to an information carrier intended to be read and/or written by a periodic array of light spots, said information carrier comprising:
- a data area defined by a set of elementary data areas,
- a first periodic structure and a second periodic structure having an identical first period, said first and second periodic structures being intended to interfere with said periodic array of light spots for generating a first and a second Moiré pattern, respectively.

Each Moiré pattern generated by the periodic structures may be used to derive the absolute value of the angular misalignment, while the combination of information derived from both Moiré patterns is used for determining the sign of said angular misalignment.

Using Moiré patterns is an advantage because it leads to an accurate measure of the misalignment angle.

Moreover, the printing of such periodic structures on the information carrier is cost-effective and thus dedicated to a content distribution context.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
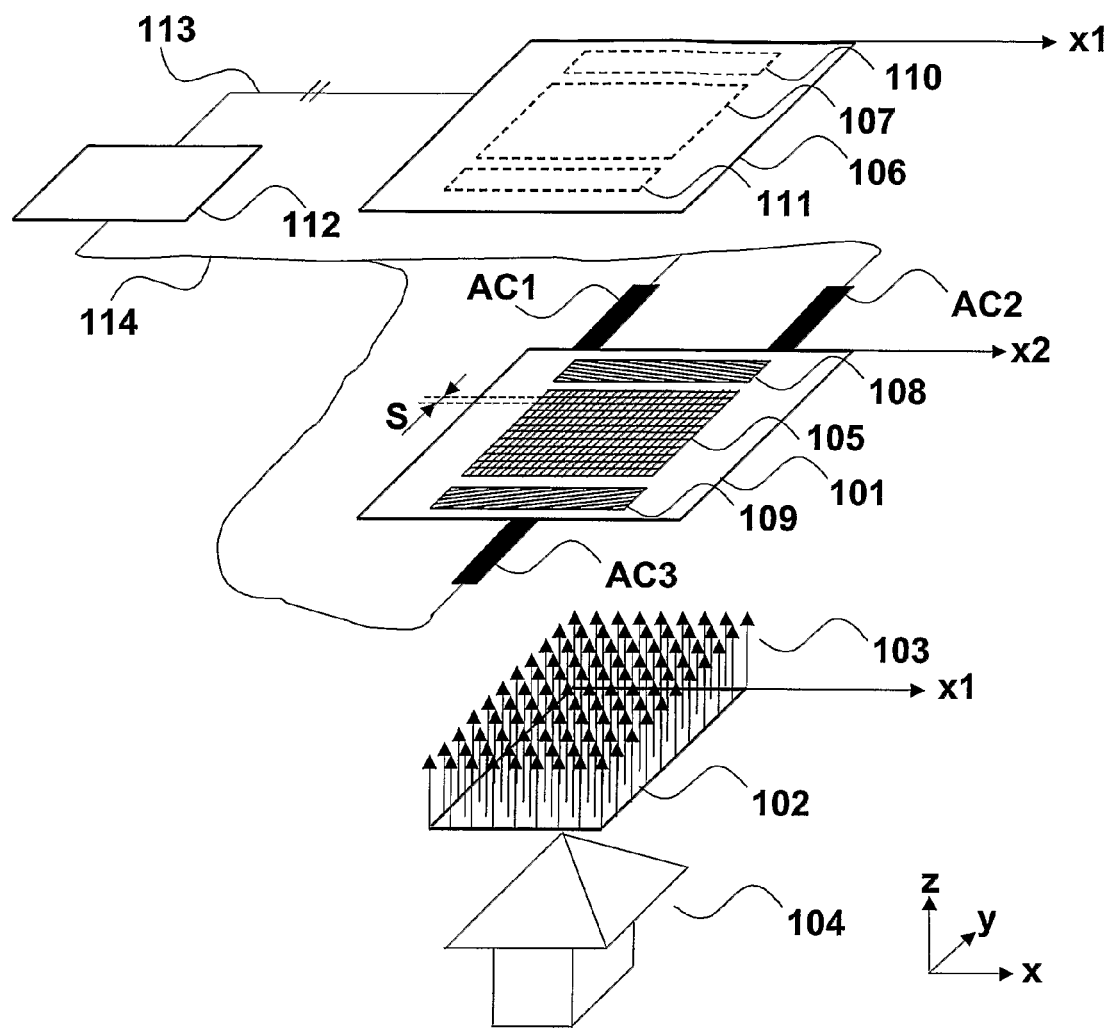
FIG. 1 depicts a system according to the invention.

FIG. 1 depicts a three-dimensional view of the system according to the invention aimed at generating control signals reflecting the angular misalignment of an information carrier 101 in a reading apparatus, and for correcting said angular misalignment based on said control signals.

The system comprises an optical element 102 for generating a periodic array of light spots 103 intended to be applied and to scan the information carrier 101. An input light beam 104 is applied to the input of the optical element 102. The input light beam 104 can be realized by a waveguide (not represented) for expanding an input laser beam, or by a two-dimensional array of coupled micro lasers.

Figure 2:
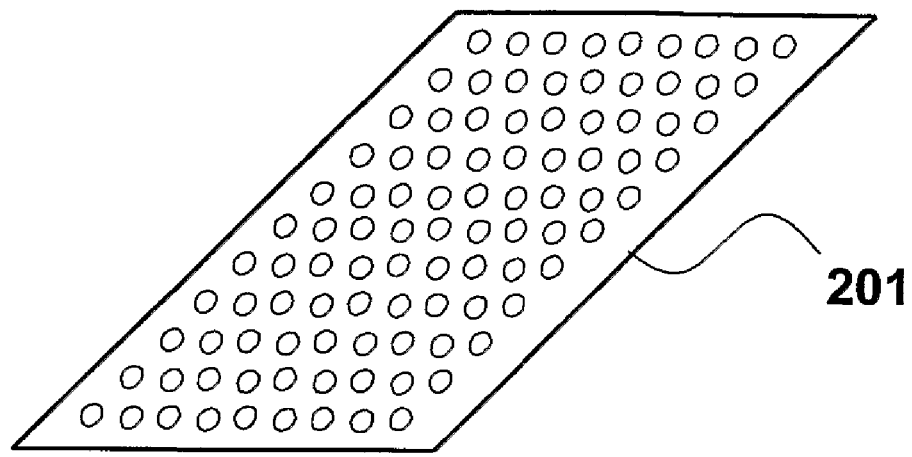
FIG. 2 depicts a first optical element according to the invention.

According to a first embodiment depicted in FIG. 2, the optical element 102 corresponds to a two-dimensional array 201 of micro-lenses to the input of which the coherent input light beam 104 is applied. The array of micro-lenses is placed parallel and distant from the information carrier 101 so as to focus the light spots on the surface of the information carrier 101. The numerical aperture and quality of the micro-lenses determines the size of the light spots. For example, a two-dimensional array of micro-lenses having a numerical aperture which equals 0.3 may be used.

Figure 3:
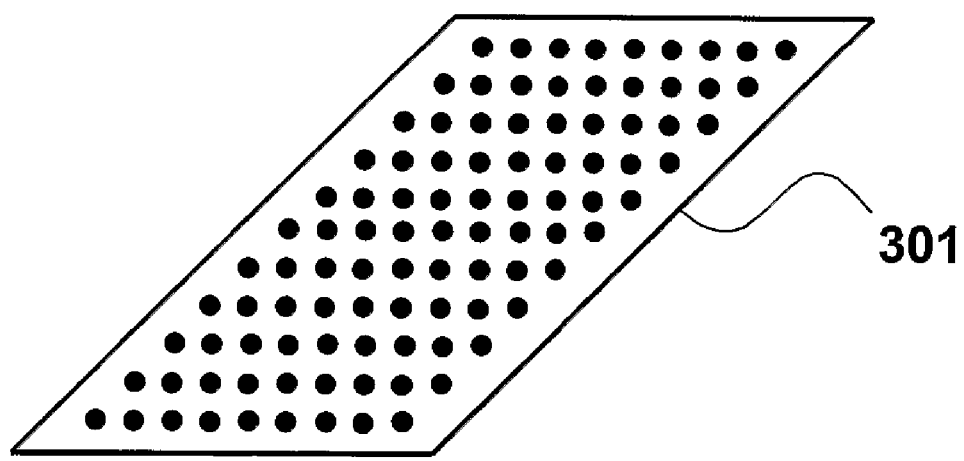
FIG. 3 depicts a second optical element according to the invention.

According to a second embodiment depicted in FIG. 3, the optical element 102 corresponds to a two-dimensional array of apertures 301 to the input of which the coherent input light beam 104 is applied. The apertures correspond for example to circular holes having a diameter of 1 μm or much smaller.

In this second embodiment, the array of light spots 103 is generated by the array of apertures in exploiting the Talbot effect which is a diffraction phenomenon working as follows. When a number of coherent light emitters of the same wavelength, such as the input light beam 104, are applied to an object having a periodic diffractive structure, such as the array of apertures, the diffracted lights recombine into identical images of the emitters at a plane located at a predictable distance z0 from the diffracting structure. This distance z0, at which the information carrier 101 is placed, is known as the Talbot distance. The Talbot distance z0 is given by the relation $z0=2.n.d^2/\lambda$, where d is the periodic spacing of the light emitters, λ is the wavelength of the input light beam, and n is the refractive index of the propagation space. More generally, re-imaging takes place at other distances z(m) spaced further from the emitters and which are a multiple of the Talbot distance z such that $z(m)=2.n.m.d^2/\lambda$, where m is an integer. Such re-imaging also takes place for m=½+an integer, but here the image is shifted over half a period. The re-imaging also takes place for m=¼+an integer, and for m=¾+an integer, but the image has a doubled frequency which means that the period of the light spots is halved with respect to that of the array of apertures.

Exploiting the Talbot effect allows generating an array of light spots of high quality at a relatively large distance from the array of apertures (a few hundred μm, expressed by z(m)), without the need for optical lenses. This allows inserting for example a cover layer between the array of aperture and the information carrier for preventing the latter from contamination (e.g. dust, finger prints . . . ). Moreover, this facilitates the implementation and allows increasing the density of light spots in a cost-effective manner compared to the use of an array of micro-lenses, which light spots are applied to the information carrier.

Coming back to FIG. 1, the information carrier 101 comprises a data area 105 intended to store binary data. The data area 105 comprises adjacent elementary data areas organized as in a matrix. The elementary data areas are represented as adjacent squares but they could have a different shape. The size of the elementary data areas is referred to as S. The states of binary data stored on the data area 105 are for example represented by transparent or non-transparent elementary areas (i.e. light-absorbing). The elementary areas are printed on a material such as glass or plastic.

The light spots are applied on the elementary areas of the information carrier 101. If a light spot is applied on a non-transparent elementary area, no output light beam passes through the information carrier. On the contrary, if a light spot is applied on a transparent elementary area, it passes through the information carrier and can be detected afterwards by a detector 106.

Each light spot is applied and scanned over a partial area of the data area 105. The scanning of the information carrier 101 is performed by displacing the array of light spots 103 along the x and y axis.

The detector 106 is notably used for detecting the binary value of the elementary data areas on which optical spots are applied. To this end, the detector 106 comprises a data detection area 107 opposite the data area 105 of the information carrier, in parallel planes. It is advantageously made of an array of CMOS or CCD pixels. Advantageously, one pixel of the detector is intended to detect a set of elementary data, each data among this set of elementary data being successively read by a single light spot of said array of light spots 103. This way of reading data on the information carrier 101 is called macro-cell scanning in the following and will be described hereinafter.

Figure 4:
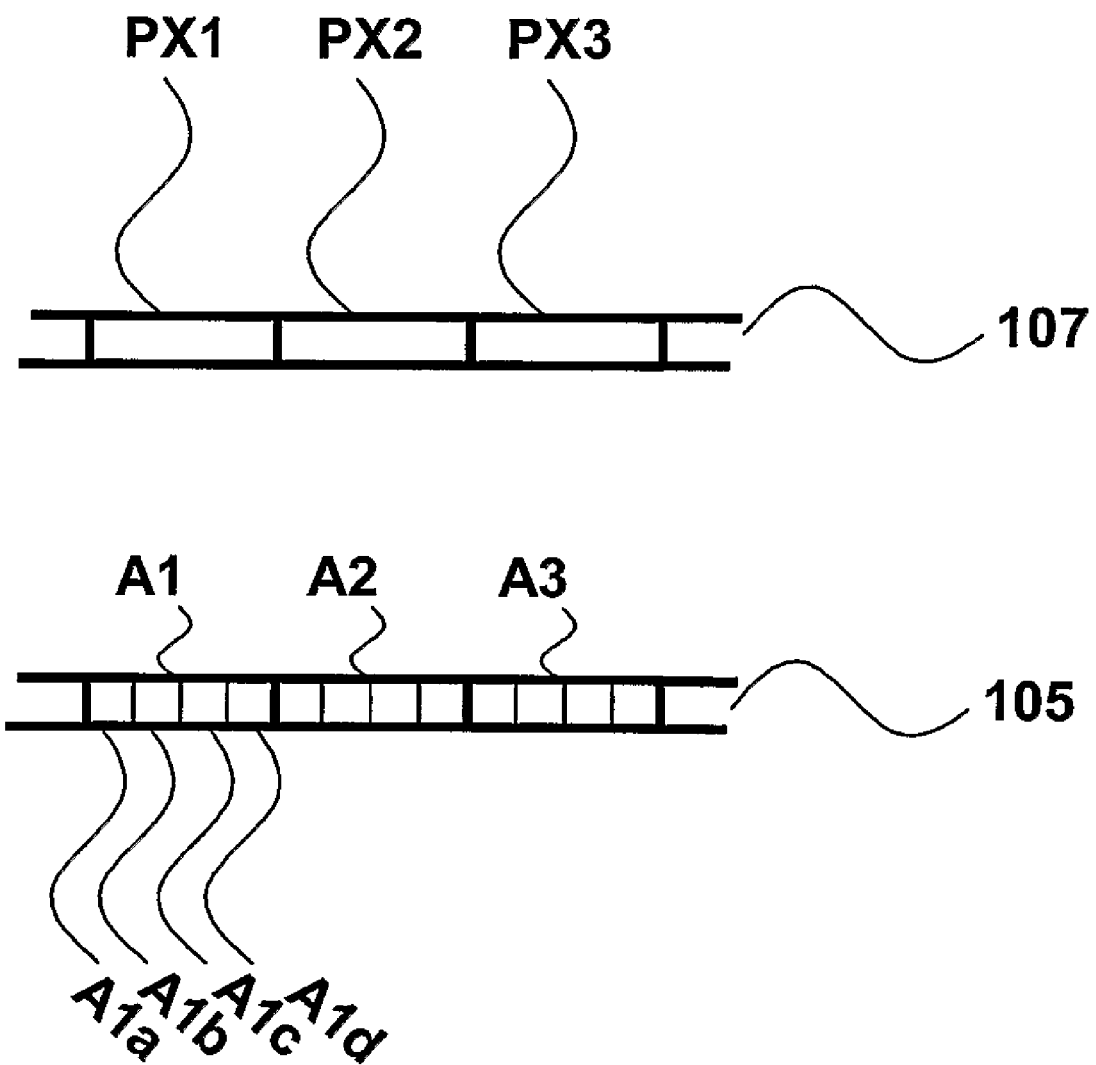
FIG. 4 depicts a detailed view of the system according to the invention.

FIG. 4 depicts a cross-section and detailed view of the data area 105 of the information carrier 101, and the data detection area 107 of the detector 106. The detector 106 comprises pixels referred to as PX1-PX2-PX3, the number of pixels shown being limited for facilitating the understanding. In particular, pixel PX1 is intended to detect data stored on the data area A1 of the information carrier, pixel PX2 is intended to detect data stored on the data area A2, and pixel PX3 is intended to detect data stored on the data area A3. Each data area, also called macro-cell, comprises a set of elementary data. For example, data area A1 comprises elementary data referred to as A1a-A1b-A1c-A1d.

Figure 5:
FIG. 5 illustrates the principle of macro-cell scanning according to the invention.
Figure 5:
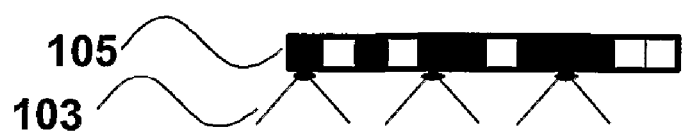
Figure 5:
Figure 5:
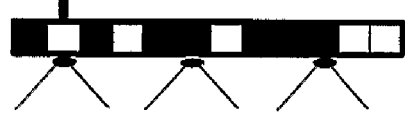
Figure 5:
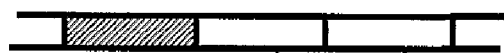
Figure 5:
Figure 5:
Figure 5:
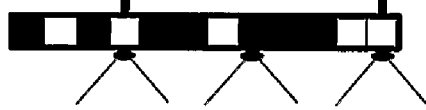

FIG. 5 illustrates by an example the macro-cell scanning of an information carrier 101. Data stored on the information carrier have two states indicated either by a black area (i.e. non-transparent) or white area (i.e. transparent). For example, a black area corresponds to a "0" binary state, whereas a white area corresponds to a "1" binary state. When a pixel of the detector is illuminated by an output light beam generated by the information carrier 101, the pixel is represented by a white area. In that case, the pixel delivers an electric output signal (not represented) having a first state. On the contrary, when a pixel of the detection area 107 does not receive any output light beam from the information carrier, the pixel is represented by a shaded area. In that case, the pixel delivers an electric output signal (not represented) having a second state.

In this example, each set of data comprises four elementary data, and a single light spot is applied simultaneously to each set of data. The scanning of the information carrier 101 by the array of light spots 103 is performed for example from left to right, with an incremental lateral displacement which equals the distance S between two elementary data.

In position A, all the light spots are applied to non-transparent areas so that all pixels of the detector are in the second state.

In position B, after displacement of the light spots to the right, the light spot to the left side is applied to a transparent area so that the corresponding pixel is in the first state, while the two other light spots are applied to non-transparent areas so that the two corresponding pixels of the detector are in the second state.

In position C, after displacement of the light spots to the right, the light spot to the left side is applied to a non-transparent area so that the corresponding pixel is in the second state, while the two other light spots are applied to transparent areas so that the two corresponding pixels of the detector are in the first state.

In position D, after displacement of the light spots to the right, the central light spot is applied to a non-transparent area so that the corresponding pixel is in the second state, while the two other light spots are applied to transparent areas so that the two corresponding pixels of the detector are in the first state.

The scanning of the information carrier 101 is complete when the light spots have been applied to all data of a set of data facing a pixel of the detector. It implies a two-dimensional scanning of the information carrier. Elementary data which form a set of data opposite a pixel of the detector are read successively by a single light spot.

The scanning of the information carrier by the array of light spots is done in a plane parallel to the information carrier. A scanning device provides translational movement in the two directions x and y for scanning the whole surface of the information carrier.

Figure 6:
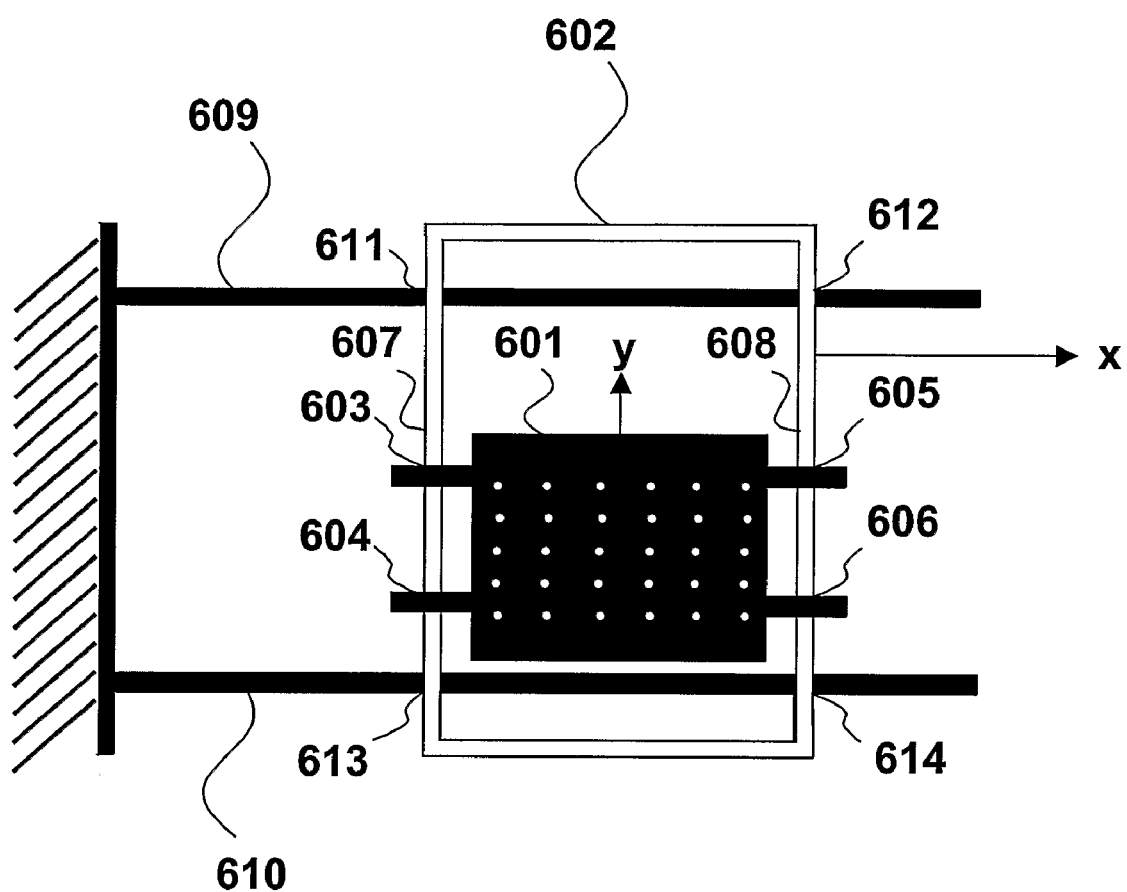
FIG. 6 depicts the scanning of an information carrier according to the invention.

According to a first solution depicted in FIG. 6, the scanning device corresponds to an H-bridge. The optical element 102 generating the array of light spots (i.e. the array of microlenses or the array of apertures) is implemented in a first sledge 601 which is movable along the y axis compared to a second sledge 602 movable along the x axis. To this end, the first sledge 601 comprises joints 603-604-605-606 in contact with guides 607-608. The second sledge 602 is movable along the x axis by means of joints 611-612-613-614 in contact with guides 609-610. The sledges 601 and 602 are translated by means of actuators (not represented), such as by stepper motors, magnetic or piezoelectric actuators acting as jacks.

Figure 7:
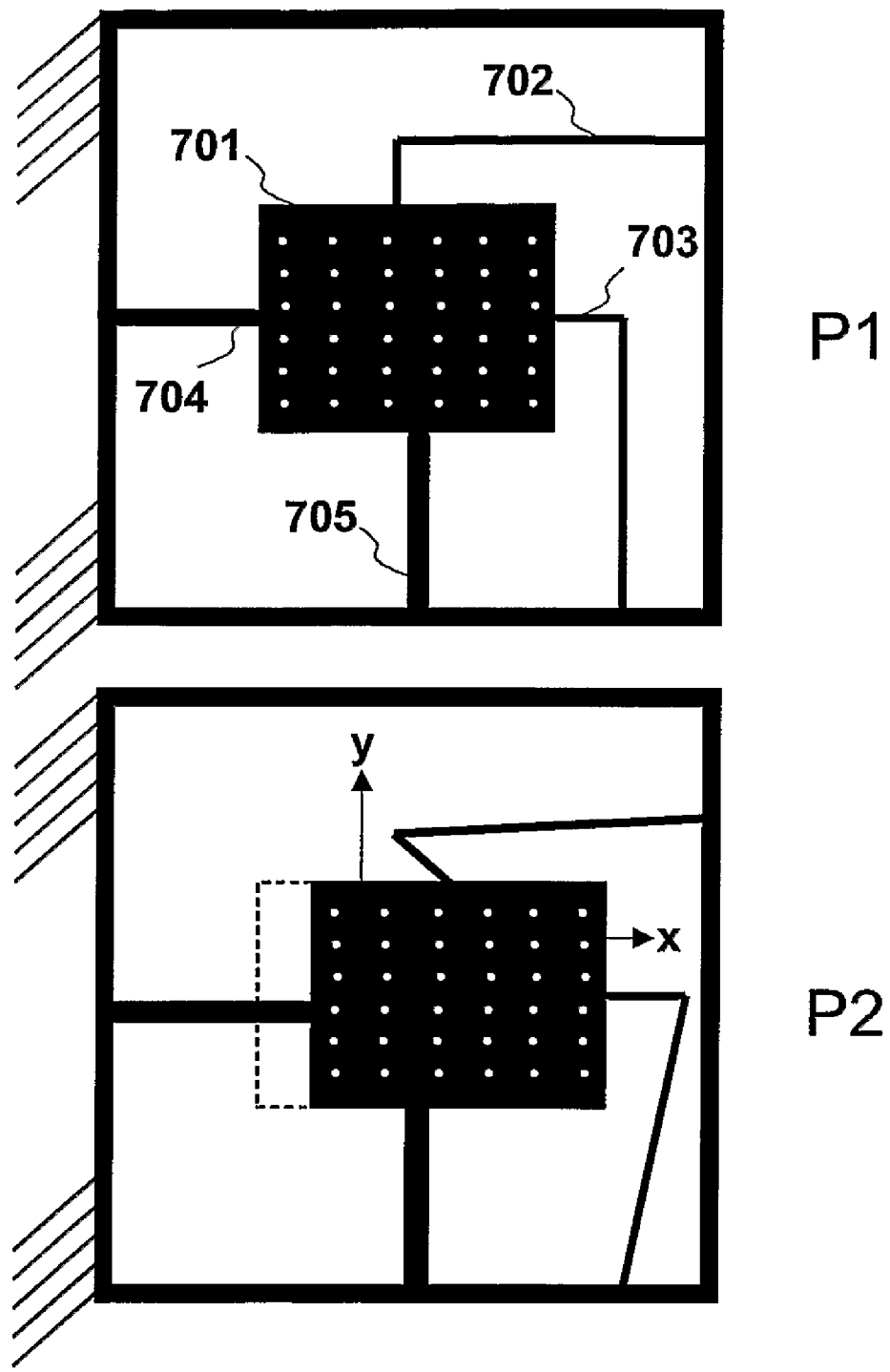
FIG. 7 illustrates by multiple views the scanning of an information carrier according to the invention.
Figure 8:
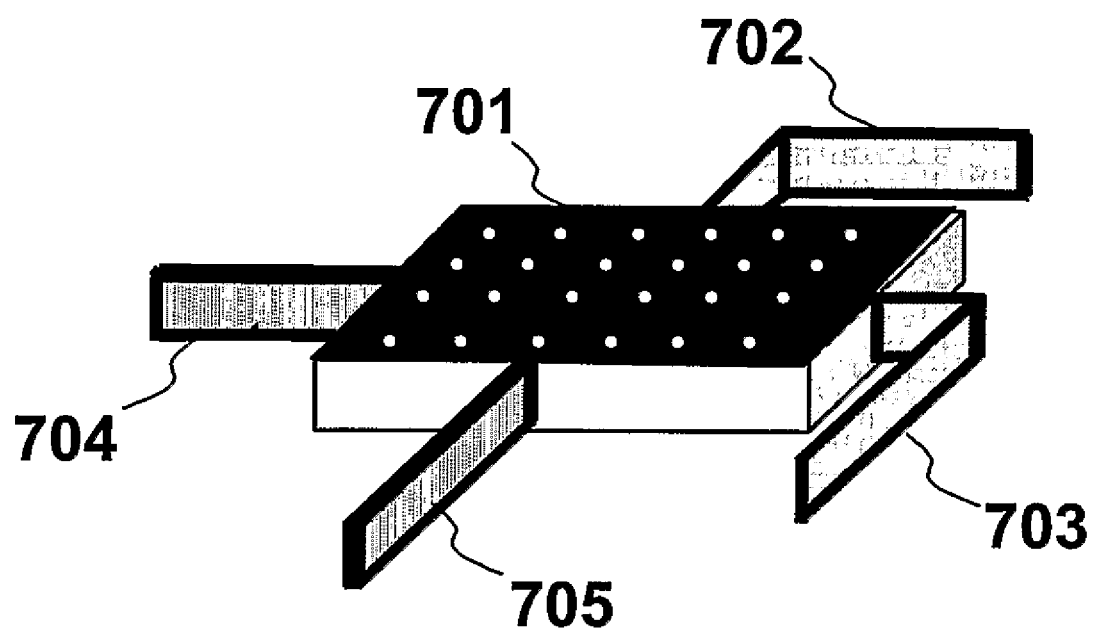
FIG. 8 depicts a detailed element of the scanning according to the invention.

According to a second solution depicted in FIG. 7, the scanning device is maintained in a frame 701. The elements used for suspending the frame 701 are depicted in a detailed three-dimensional view in FIG. 8. These elements comprise:
- a first leaf spring 702,
- a second leaf spring 703,
- a first piezoelectric element 704 providing the actuation of the scanning device 701 along the x axis,
- a second piezoelectric element 705 providing the actuation of the scanning device 701 along the y axis.

The second solution depicted in FIG. 7 has less mechanical transmissions than the H-bridge solution depicted in FIG. 6. The piezoelectric elements, in contact with the frame 701, are electrically controlled (not represented) so that a voltage variation results in a dimension change of the piezoelectric elements, leading to a displacement of the frame 701 along the x and/or y axis.

The position P1 depicts the scanning device 701 in a first position, while the position P2 depicts the scanning device 701 in a second position after translation along the x axis. This figure illustrates the flexibility of the leaf springs 702 and 703.

A similar configuration can be built with four piezoelectric elements, the two extra piezoelectric elements replacing the leaf springs 702 and 703. In that case, opposite pair of piezoelectric elements act together in one dimension in the same way as an antagonistic pair of muscles.

Coming back to FIG. 1, the information carrier 101 also comprises a first periodic structure 108, and a second periodic structure 109. The first and second periodic structures are printed on the information carrier. The periodic structures 108 and 109 are composed of transparent and non-transparent parallel stripes. The orientation of the parallel stripes will be discussed hereinafter.

The first periodic structure 108 is intended to interfere with the periodic array of light spots 103 for generating a first Moiré pattern on an area 110 of the detector 106. The first Moiré pattern is only generated by the subset of light spots taken from the periodic array of light spots 103 which is opposite the first periodic structure 108. The first periodic structure 108 and the area 110 are each other's opposites.

The second periodic structure 109 is intended to interfere with the periodic array of light spots 103 for generating a second Moiré pattern on an area 111 of the detector 106. The second Moiré pattern is only generated by the subset of light spots taken from the periodic array of light spots 103 which is opposite the second periodic structure 109. The second periodic structures 109 and the area 111 are each other's opposites.

Areas 110 and 111, advantageously made of an array of CMOS or CCD pixels, are intended to measure the light variation of said first and second Moiré patterns.

The system also comprises processing means 112 for deriving from the light variation of said first and second Moiré patterns, the angle value δ which corresponds to the misalignment between the periodic array of light spots 103 and the information carrier 101. The processing means 112 are connected to the detector 106 by means of a data bus 113. The processing means 112 may correspond to code instructions executed by a signal processor for deriving:
- a first frequency value F1 of the light variation of said first Moiré pattern,
- a second frequency value F2 of the light variation of said second Moiré pattern,
- the sign of said angle value δ from said first frequency value F1 and said second frequency value F2.

The system also comprises actuation means AC1-AC2-AC3 for adjusting the angular position of said information carrier 101 with respect to said array of light spots 103. Actuation means AC1-AC2-AC3 may correspond to piezoelectric actuators. Actuation means AC1-AC2-AC3 are controlled by control signals 114 carried by wires and generated by said processing means 112. Said control signals are derived from said angle value δ.

In a first embodiment as depicted in FIG. 1, the actuation means AC1-AC2-AC3 are in contact with the periphery of the information carrier 101. In this case, the array of light spots 103 is fixed, while the information carrier 101 may rotate under the control of said actuation means.

Alternatively, in a second embodiment (not depicted), the actuation means AC1-AC2-AC3 are in contact with the periphery of the optical element 102 generating the array of light spots 103. In this case, the information carrier 103 is fixed, while the array of light spots 103 may rotate under the control of said actuation means on said optical element 102.

The use of three actuators AC1-AC2-AC3 is sufficient to rotate the information carrier 101 (or the optical element 102) around the vertical axis z, so as to correct the angular misalignment δ.

Figure 9:
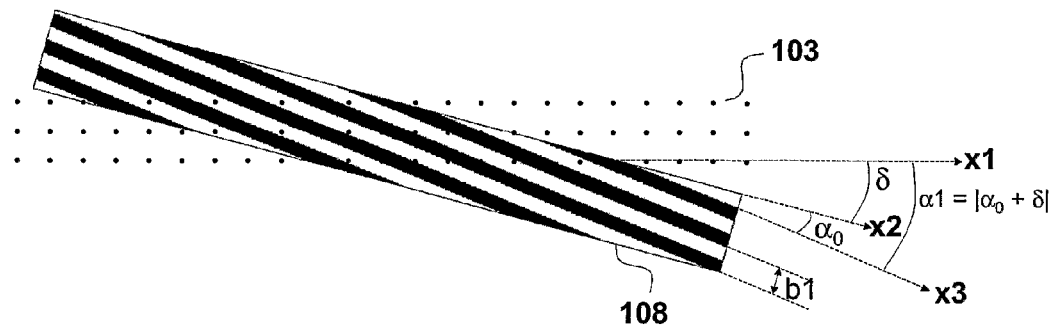
FIG. 9 depicts a first partial top view of the system according to the invention.

FIG. 9 depicts a partial top view of the system depicted in FIG. 1. It represents the first periodic structure 108 and the subset of light spots 103 intended to be applied to said first periodic structure.

The subset of light spots 103 is oriented along axis x1, whereas the first periodic structure 108 is oriented along axis x. The period of the periodic structure 108 is referred to as b1.

The angle between axis x1 and axis x2 corresponds to the angular misalignment δ between the information carrier 101 and the array of light spots 103. For the sake of clarity, it is noted that the misalignment angle δ0 has been represented much larger than it would be in reality.

The first periodic structure 108 is oriented along axis x3, so that axis x2 and axis x3 define said first and known angle α0. The absolute value of the angle between axis x1 and axis x3 is thus defined as:

$$\alpha 1=|\alpha 0+\delta| \quad (1)$$

Figure 11:
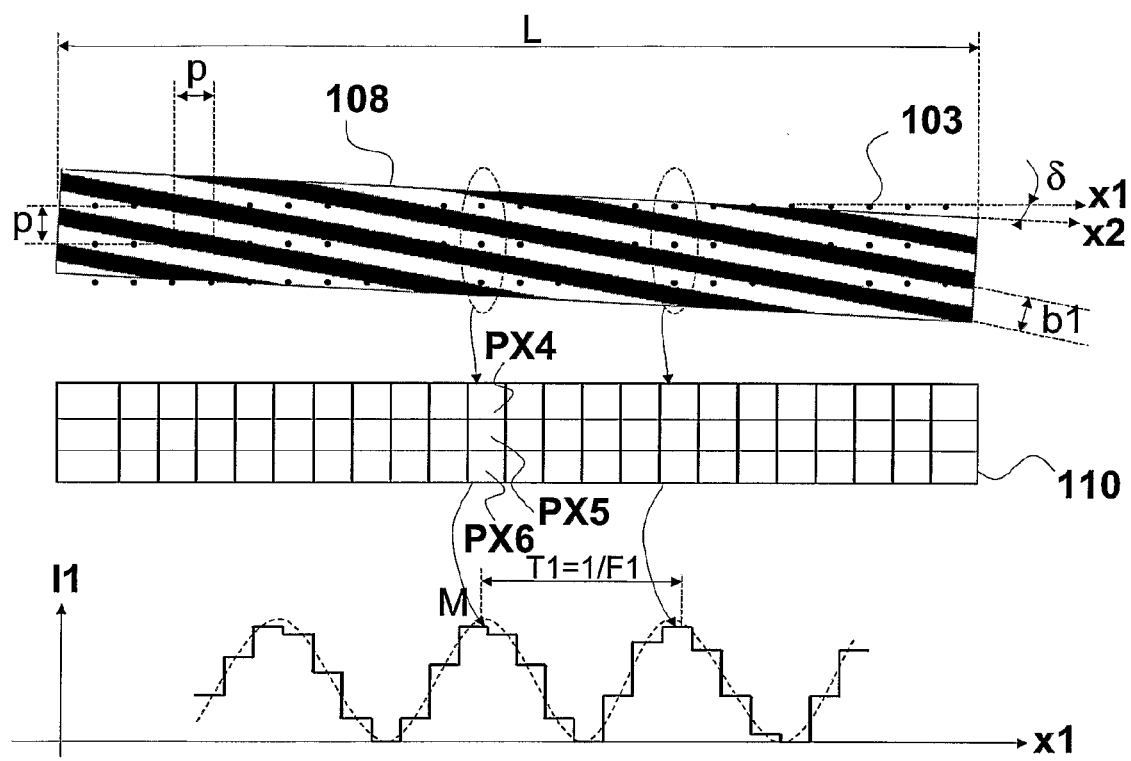
FIG. 11 illustrates the generation and detection of a Moiré pattern according to the invention.

FIG. 11 depicts a similar partial top view to the one depicted in FIG. 9, wherein the projection of the light variation I1 of the first Moiré pattern is drawn as an example.

The first Moiré pattern results from the interference between the periodic light spots 103 and the first periodic structure 108 placed on the information carrier 101. This optical phenomenon generally occurs when an input image with a periodic structure (i.e. the periodic structure 108 in the present case) is sampled with a periodic sampling grid (i.e. the periodic array of light spots in the present case) having a period which is close or equal to that of the input image, which results in aliasing. The sampled image is magnified and rotated according to an angle whose value depends on:
- the ratio between the period of the input image and the period of the sampling grid,
- the angular position between the input image and the sampling grid (i.e. between the periodic structure 108 and the periodic array of light spots in the present case).

If the light variation of the sampled image is projected on a given and the same axis (i.e. axis x1 in the present case) to obtain a projection signal, the period of this projection signal changes when the relative angular position between the input image and the sampling grid varies (i.e. angular change between the periodic structure 108 and the periodic array of light spots 103 in the present case).

In the present case, the projection along axis x1 of the light variation of the first Moiré pattern is done by detection area 110. The detection area 110, the periodic structure 108 and the subset of light spots 103 are superimposed, but for the sake of clarity, the detection area 110 is represented below.

Each partial measure M that defines the projection signal 11 may derive from the sum of a part of the Moiré pattern detected by detection area 110. For example, a partial measure M may be derived from the sum of signals generated by a set of adjacent pixels PX4-PX5-PX6 of the detector, and so on for the definition of the other partial measures. Alternatively, a single pixel covering the surface of pixels PX4-PX5-PX6 may be defined for generating the partial measure M.

The accuracy with which the frequency of the light variation can be determined depends on the length L of the periodic structure 108.

In the present case where the data area 105 of the information carrier is made of adjacent elementary data areas, it can be set as a constraint that the accuracy of the angular measure does not exceed the size S of an elementary data area over the full length $L_{full}$ of the information carrier. With these conditions, it can be shown that the following relation must be verified:

$$b/S=L/L_{full} \quad (2)$$

For example, it can be decided to set b=S and L=$L_{full}$, where S corresponds to the distance between two adjacent elementary data areas of the data area 105.

Note that if the information carrier 101 has sides of different lengths, the length L of the information carrier should be interpreted as the size of the longest side, and if the information carrier is read out in segments, the length L of the information carrier should be interpreted as the length of the segment.

It can be shown that for values of angle α1 verifying:

$$b/L<\alpha 1<b/2p \quad (3)$$

where
b is the period of the periodic structure 108,
L is the length of the periodic structure 108,
p is the period of the periodic array of light spots 103, the absolute value of angle α1 may be derived from the following relation:

$$\sin(\alpha 1)=b.F1 \quad (4)$$

where F1 is the frequency of the projection signal I1.

The measurement of the first frequency value F1 is performed by the processing means 112, for example in detecting consecutive minimums and maximums in the projection signal I1 to derive the period T1 and then F1 defined by F1=1/T1, or making an inverse Fourier Transform and taking the first-order coefficient as a measure of F1.

From (1), the knowledge of the absolute value of angle α1 is sufficient to derive the absolute value of angle δ, but not the sign of angle δ. The sign of angle δ is important because it indicates in which direction the array of light spots 103 is rotated with respect to the information carrier 101, and thus in which direction the actuators AC1-AC2-AC3 have to act to cancel the angular misalignment δ.

To determine the sign of angle δ, the second Moiré pattern generated on the detection area 111 by the second periodic structure 109 is analysed similarly to the first Moiré pattern generated by the first periodic structure 108. The detection area 111, the periodic structure 109 and the subset of light spots 103 are superimposed.

Figure 10:
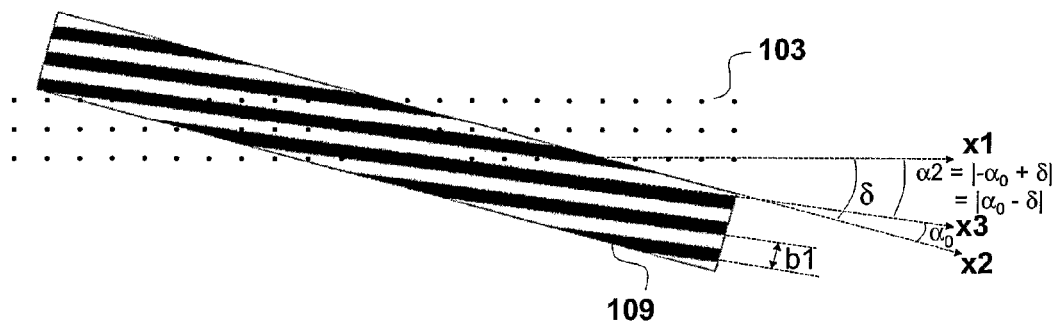
FIG. 10 depicts a second partial top view of the system according to the invention.

FIG. 10 depicts a partial top view of the system depicted in FIG. 1. It represents the second periodic structure 109 and the subset of light spots 103 intended to be applied to said second periodic structure 109.

The subset of light spots 103 is oriented along axis x1, while the second periodic structure 109 is oriented along axis x2. The period of the periodic structure 108 is also referred to as b1.

The angle between axis x1 and axis x2 corresponds to the angular misalignment δ between the information carrier 101 and the array of light spots 103. For the sake of clarity, it is noted that the misalignment angle δ has been represented much larger than it would be in reality.

The second periodic structure 109 is oriented along axis x3, so that axis x2 and axis x3 define said second and known angle α0 as opposed to that of the first periodic structure 108. The absolute value of the angle α2 between axis x1 and axis x3 is thus defined as:

$$\alpha 2=|\alpha 0-\delta| \quad (5)$$

A projection of the light variation of the second Moiré pattern is performed for generating a projection signal I2 (similarly as signal I1 described above) whose frequency value F2 is calculated similarly to the first frequency value F1. This allows to derive the absolute value of the angle $\alpha 2$ between axis x1 and axis x3:

$$\sin(\alpha 2) = b \cdot F2 \quad (6)$$

where F2 is the second frequency value of projection signal 12.

With the knowledge of $\alpha 1$ and $\alpha 2$ derived from (4) and (6) from frequency F1 and frequency F2, respectively, the sign of angle $\delta$ may thus be derived from the relation:

$$\text{sign}(\delta) = \text{sign}(\alpha 1 - \alpha 2) \quad (7)$$

where sign($\delta$) represents the sign of parameter $\delta$.

Alternatively, to determine the sign of angle $\delta$, the second periodic structure 109 may be chosen as a structure identical with the first periodic structure 108, and placed parallel to the first periodic structure 108. In this case, the sign of angle $\delta$ is given by the sign of the phase difference between the signal derived from the projection of the first Moiré pattern generated by the first periodic structure 108, and the signal derived from the projection of the second Moiré pattern generated by the second periodic structure 109.

The analysis of Moiré patterns described above applies when angles $\alpha 1$ and $\alpha 2$ are in the range [b/L, b/2p]. For example, if the parameters of the system depicted in FIG. 1 are such that b=500 nm, L=2 cm and p=15 µm, angles $\alpha 1$ and $\alpha 2$ to be measured may be in the range [2e-5, 0.017], corresponding to angles approximately between 0 and 1 degree. In this case, angle $\alpha 0$ is advantageously in the order of a few tenths of a degree.

To be able to measure larger angles $\alpha 1$ and $\alpha 2$, and as a consequence a larger misalignment angle $\delta$, the period b1 of the first periodic structure 108 and the second periodic structure 109 may be increased. For example, if b=p=15 µm, angles $\alpha 1$ and $\alpha 2$ to be measured may be in the range [7.5e-4, 0.5], corresponding to angles approximately between 0.04 and 30 degrees. In this case, angle $\alpha 0$ is advantageously in the order of a few degrees.

Advantageously, it may also be possible to define an information carrier having a first set of periodic structures 108-109 having a first period b1, and a second a set of periodic structures 108'-109' having a second period b2 different from the first period b1 (i.e. larger or smaller), as described hereinafter in FIGS. 12 to 14. A rough measurement and correction of the angular misalignment can be performed in using periodic structures having a large period, while a fine measurement and correction of the angular misalignment can be performed in using periodic structures having a smaller period.

Figure 12:
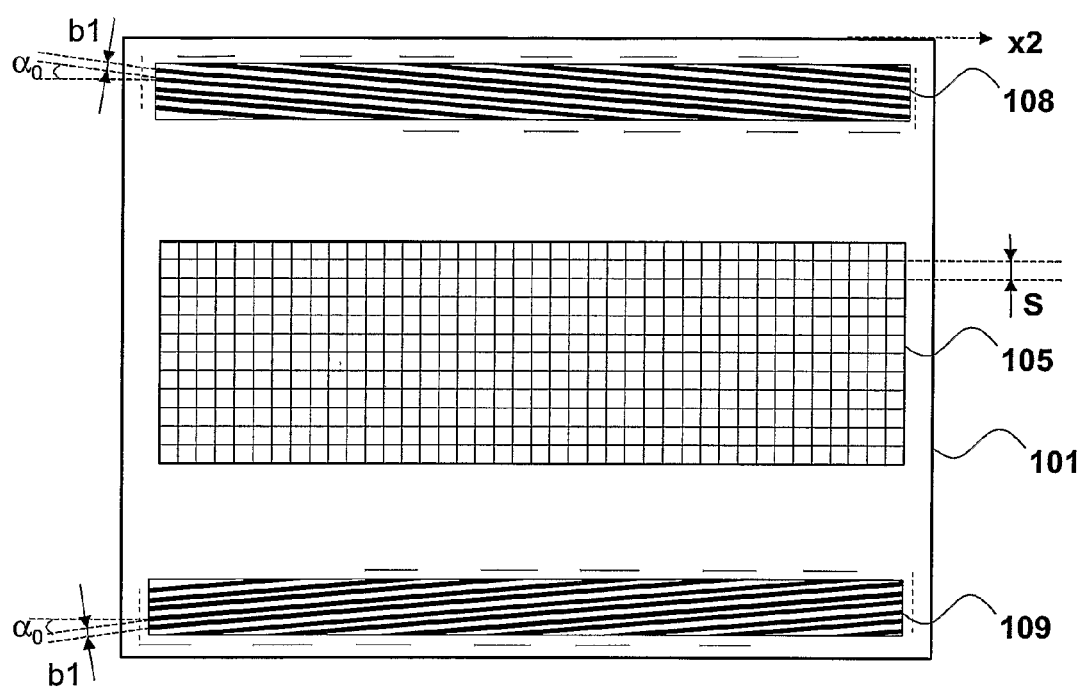
FIG. 12 depicts a first embodiment of an information carrier according to the invention.

FIG. 12 depicts an information carrier 101 intended to be read/write by a periodic array of light spots (not represented). The information carrier 101 comprises:

a data area 105 defined by a set of elementary data areas. The elementary data areas are organized as in a matrix. The distance between two adjacent elementary data is referred to as S.

a first periodic structure 108 and a second periodic structure 109 having an identical first period b1. The first periodic structure 108 is made of parallel stripes oriented according to a first angle $\alpha 0$, while the second periodic structure 109 is made of parallel stripes oriented according to a second angle being the opposite to said first angle $\alpha 0$. Angle $\alpha 0$ is evaluated from axis x2 which corresponds to the axis of the information carrier 101 and to the periodic structures. The periodic structures 108-109 are placed in parallel and on each side of the data area 105.

As described previously, the first and second periodic structures 108-109 are intended to interfere with a periodic array of light spots for generating a first and a second Moiré pattern, respectively.

Figure 13:
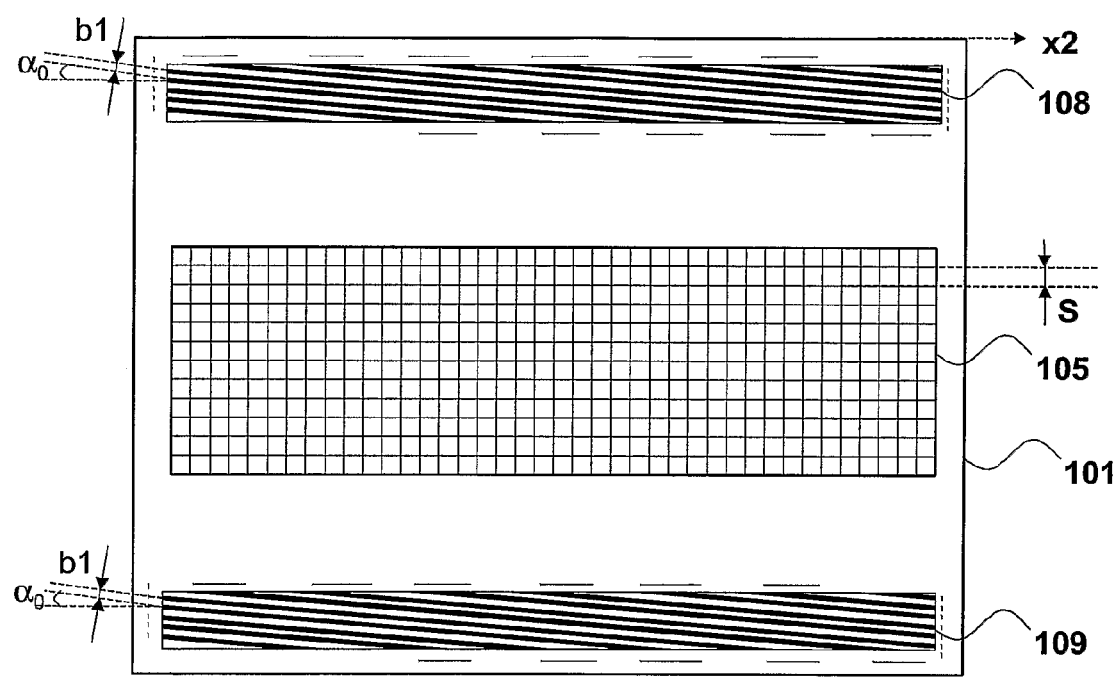
FIG. 13 depicts a second embodiment of an information carrier according to the invention.

FIG. 13 depicts an information carrier 101 intended to be read/written by a periodic array of light spots (not represented). The information carrier 101 comprises:

a data area 105 defined by a set of elementary data areas. The elementary data areas are organized as in a matrix. The distance between two adjacent elementary data is referred to as S.

a first periodic structure 108 and a second periodic structure 109 having an identical first period b1. The first periodic structure 108 is made of parallel stripes oriented according to a first angle $\alpha 0$, while the second periodic structure 109 is also made of parallel stripes oriented according to said first angle $\alpha 0$. Angle $\alpha 0$ is evaluated from axis x2, which corresponds to the axis of the information carrier 101 and to the periodic structure. The periodic structures 108-109 are placed in parallel and on each side of the data area 105.

As described previously, the first and second periodic structures 108-109 are intended to interfere with a periodic array of light spots for generating a first and a second Moiré pattern, respectively.

Figure 14:
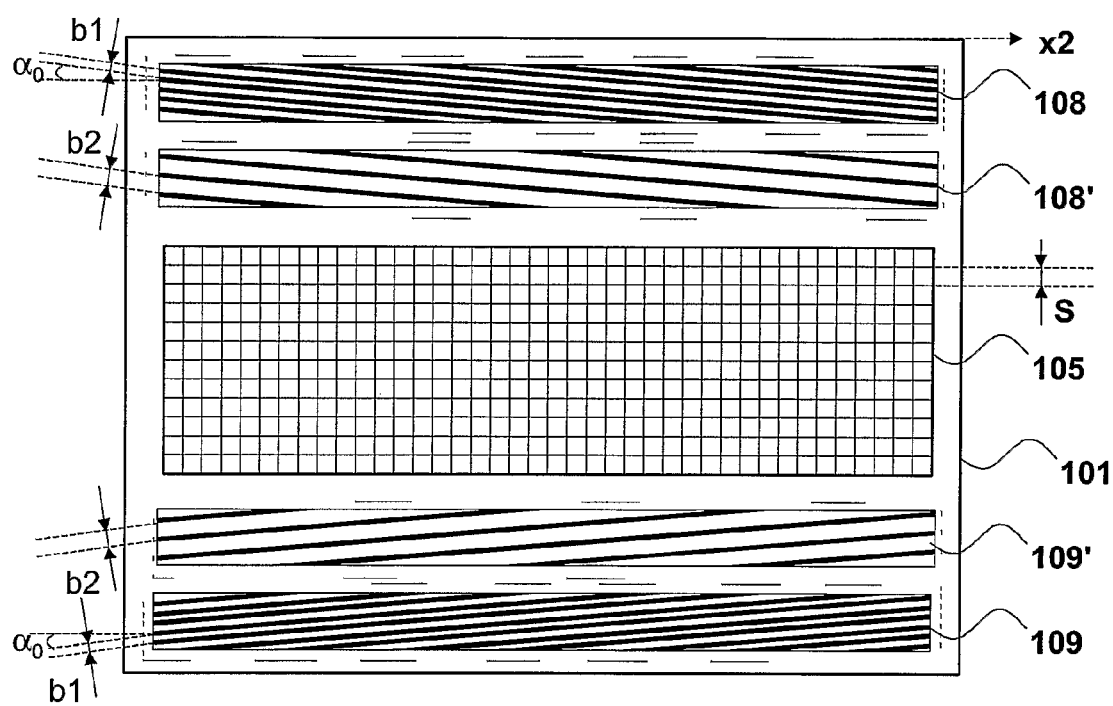
FIG. 14 depicts a third embodiment of an information carrier according to the invention.

FIG. 14 depicts an information carrier 101 intended to be read/written by a periodic array of light spots (not represented). The information carrier 101 comprises:

a data area 105 defined by a set of elementary data areas. The elementary data areas are organized as in a matrix. The distance between two adjacent elementary data is referred to as S.

a first periodic structure 108 and a second periodic structure 109 having an identical first period b1. The first periodic structure 108 is made of parallel stripes oriented according to a first angle $\alpha 0$, while the second periodic structure 109 is also made of parallel stripes oriented according to said first angle $\alpha 0$. Angle $\alpha 0$ is evaluated from axis x2 which corresponds to the axis of the information carrier 101 and to the periodic structures. The periodic structures 108-109 are placed in parallel and on each side of the data area 105.

a third periodic structure 108' and a fourth periodic structure 109' having an identical second period b2, said second period b2 being different from said first period b1. The third and fourth periodic structures are made of parallel stripes oriented according to a same (as represented) or opposite angle (not represented) which may be equal or different from said first angle $\alpha 0$. The periodic structures 108'-109' are placed in parallel and on each side of the data area 105.

As described previously, the first, second, third and fourth periodic structures 108-109-108'-109' are intended to interfere with a periodic array of light spots for generating a first, second, third and fourth Moiré pattern, respectively.

Figure 15:
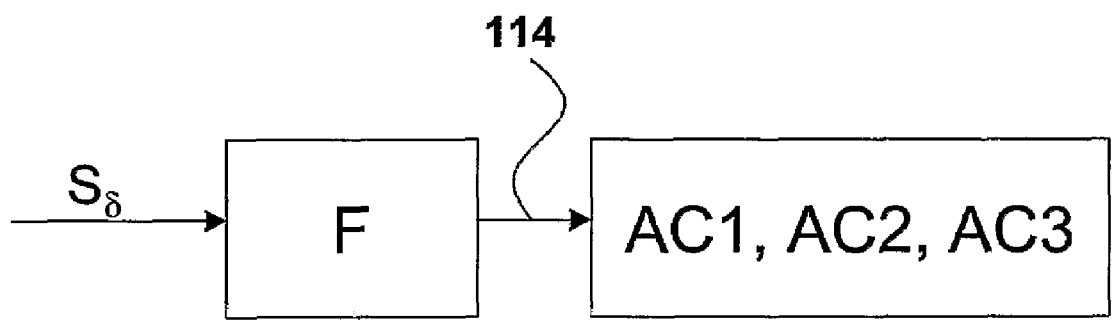
FIG. 15 depicts the principle of the angular correction according to the invention.

FIG. 15 depicts the principle of the loop control performed by the processing means 112 for adjusting the angular position of the information carrier 101 with respect to the array of light spots 103.

A signal $S_\delta$ reflecting the value of angle $\delta$ is passed through a low-pass filter F intended to generate controls signals 114 to actuators AC1-AC2-AC3. In response, the actuators AC1-AC2-AC3 correct their angular position, which modifies the measured angle $\delta$. The optimal alignment between the information carrier and the array of light spots is reached when angle $\delta$ tends to zero.

The system according to the invention can advantageously be implemented in an apparatus for reading and/or writing data on an information carrier as previously described.

Use of the verb "to comprise" and its conjugations does not exclude the presence of elements or steps other than those stated in the claims. Use of the article "a" or "an" preceding an element or step does not exclude the presence of a plurality of such elements or steps.

The invention claimed is:

1. System comprising:
    an optical element (102) for generating a periodic array of light spots (103) intended to be applied to an information carrier (101), said information carrier (101) comprising a first periodic structure (108) intended to interfere with said periodic array of light spots (103) for generating a first Moiré pattern, and a second periodic structure (109) intended to interfere with said periodic array of light spots (103) for generating a second Moiré pattern,
    analysis means for deriving from said first and second Moiré patterns the angle value ($\delta$) between said periodic array of light spots (103) and said information carrier (101), actuation means (AC1-AC2-AC3) for adjusting the angular position of said information carrier (101) with respect to said array of light spots (103) based on control signals (114) derived from said angle value ($\delta$).

2. System as claimed in claim 1 wherein said analysis means comprises:
    a detector (106) for measuring the light variation of said first Moiré pattern and the light variation of said second Moiré pattern,
    processing means (112) for deriving a first frequency value (F1) of the light variation of said first Moiré pattern, for deriving a second frequency value (F2) of the light variation of said second Moiré pattern, and for deriving the sign of said angle value ($\delta$) from said first frequency value (F1) and said second frequency value (F2).

3. System as claimed in claim 1 wherein the detector (106) comprises sets of adjacent pixels (PX4-PX5-PX6) intended to generate partial measures (M) defining said light variations.

4. Information carrier (101) intended to be read and/or written by a periodic array of light spots, said information carrier (101) comprising:
    a data area (105) defined by a set of elementary data areas,
    a first periodic structure (108) intended to interfere with said periodic array of light spots for generating a first Moiré pattern,
    and a second periodic structure (109) having an identical first period (b1), said second periodic structure (109) being intended to interfere with said periodic array of light spots for generating a second Moiré pattern.

5. Information carrier as claimed in claim 4, further comprising:
    a third periodic structure (108') being intended to interfere with said periodic array of light spots for generating a third Moiré pattern,
    a fourth periodic structure (109') having an identical second period (b2), said second period (b2) being different from said first period (b1), said fourth periodic structure (109') being intended to interfere with said periodic array of light spots for generating a fourth Moiré pattern.

6. Information carrier as claimed in claim 4 wherein:
    the first periodic structure (108) is made of parallel stripes oriented according to a first angle ($\alpha 0$),
    the second periodic structure (109) is made of parallel stripes oriented according to said first angle ($\alpha 0$) or according to a second angle as opposed to said first angle ($\alpha 0$).

7. Information carrier as claimed in claim 4, wherein the length of said first, second, third and fourth periodic structures (108-109-108'-109') corresponds to a length (L) of the information carrier (101).

8. Information carrier as claimed in claim 5 wherein:
    said first period (b1) corresponds to the distance (S) between two adjacent elementary data areas,
    said second period (b2) corresponds to the period (p) of said periodic array of light spots.

9. Apparatus for reading and/or writing data on an information carrier, said apparatus comprising:
    an optical element (102) for generating a periodic array of light spots (103) intended to be applied to said information carrier (101), said information carrier (101) comprising a first periodic structure (108) and a second periodic structure (109), said first and second periodic structures (108-109) being intended to interfere with said periodic array of light spots (103) for generating a first Moiré pattern and a second Moiré pattern, respectively,
    analysis means for deriving from said first and second Moiré patterns, the angle value ($\delta$) between said periodic array of light spots (103) and said information carrier (101),
    actuation means (AC1-AC2-AC3) for adjusting the angular position of said information carrier (101) with respect to said array of light spots (103) based on control signals (114) derived from said angle value ($\delta$).

* * * * *